United States Patent [19]

Stryker et al.

[11] Patent Number: 5,088,136
[45] Date of Patent: Feb. 18, 1992

[54] PATIENT TRANSFER MATTRESS SURFACE

[75] Inventors: Martin W. Stryker, Kalamazoo; Richard J. Bartow, Calhoun County, both of Mich.

[73] Assignee: Stryker Corporation, Kalamazoo, Mich.

[21] Appl. No.: 470,856

[22] Filed: Jan. 26, 1990

[51] Int. Cl.⁵ .................. A61G 7/08; A47C 27/00
[52] U.S. Cl. ............................ 5/81.1; 5/448; 5/481
[58] Field of Search ............ 5/81 B, 448, 481, 455, 5/468

[56] References Cited

U.S. PATENT DOCUMENTS

| | | |
|---|---|---|
| D. 136,717 | 11/1943 | Moore et al. |
| 1,351,480 | 8/1920 | Leigh ............ 5/455 |
| 2,021,237 | 11/1935 | Karr ............. 5/448 |
| 2,322,147 | 6/1943 | Landauer . |
| 2,616,486 | 11/1952 | Hawley .......... 5/481 |
| 3,055,785 | 9/1962 | Clauson et al. |
| 3,319,272 | 5/1967 | Eller . |
| 3,583,008 | 6/1971 | Edwards ......... 5/455 |
| 3,599,963 | 8/1971 | Grover . |
| 4,067,075 | 1/1978 | Leathers ........ 5/82 R |
| 4,329,747 | 5/1982 | Russell ......... 5/481 |
| 4,370,767 | 2/1983 | Fraser . |
| 4,383,342 | 5/1983 | Forster . |
| 4,539,057 | 9/1985 | Ahlm ........... 5/481 |
| 4,686,725 | 8/1987 | Mitchell ........ 5/481 |
| 4,924,538 | 5/1990 | Kume ........... 5/81 B |

FOREIGN PATENT DOCUMENTS 1114015 9/1961 Fed. Rep. of Germany ......... 5/455

*Primary Examiner*—Gary L. Smith
*Assistant Examiner*—Flemming Saether
*Attorney, Agent, or Firm*—Flynn, Thiel, Boutell & Tanis

[57] ABSTRACT

A mattress for use on a hospital stretcher has an upwardly facing support surface which can support a patient. The top surface of the mattress has a plurality of small, parallel ribs which extend transversely of the mattress, and which resist sliding movement of the patient lengthwise of the mattress while simultaneously facilitating sliding movement of the patient transversely of the mattress. The mattress has bevels extending along opposite sides of the support surface, the support surface being provided on a sheetlike material which extends from a lower edge of one bevel to a lower edge of the other bevel without intervening seams extending lengthwise of the mattress. The sheetlike material is preferably a laminate which includes a rip-resistant scrim layer made of a closely woven spun polyester material and two vinyl layers disposed on respective sides of the scrim layer, the ribs being provided in one of the vinyl layers on a side thereof remote from the scrim layer.

10 Claims, 1 Drawing Sheet

PATIENT TRANSFER MATTRESS SURFACE

FIELD OF THE INVENTION

This invention relates to a mattress for use in a hospital and, more particularly, to a mattress for use on a hospital bed or stretcher having a movable mattress support which can orient the mattress so that all or a portion of the mattress is inclined.

BACKGROUND OF THE INVENTION

In hospitals, it is frequently necessary to transfer a patient onto or off of the mattress on a mobile stretcher. This is normally done by placing the stretcher in a side by side relationship with another stretcher or a bed, vertically adjusting the stretcher's mattress support frame so that the top of the mattress is at about the same level as the mattress of the bed or the other stretcher, and then sliding the patient transversely onto or off of the stretcher. Moving relatively heavy patients in this manner is one of the most common cause of back injuries to hospital personnel. Therefore, in order to minimize the risk of injury to hospital personnel, it is desirable that the top surface of hospital mattresses present minimal frictional resistance to transverse sliding movement of a patient. On the other hand, simply using a low friction material for the top surface of the mattress would present other problems.

More specifically, the bed frame of hospital stretchers is usually constructed so that it can be moved to positions in which all or a portion of the mattress is inclined, for example a position in which a portion of the mattress is inclined so that the patient is in a sitting position, or a position in which the entire mattress is approximately uniformly inclined so that the patient's head is lower than his feet or his feet are lower than his head. If all or a portion of the mattress is inclined, there would be a tendency for the patient to slide lengthwise on the mattress, and possibly even off the mattress. Obviously, if the patient slides off the mattress head first, the patient could be seriously injured.

Consequently, there are directly competing criteria with respect to the desirable characteristics for the top surface of the mattress. On the one hand, it is desirable that the surface have a low coefficient of friction to facilitate lateral sliding transfers of patients transversely onto and off of the mattress, but on the other hand it is desirable that the surface have a relatively high coefficient of friction so that there will be little or no tendency for a patient to slide lengthwise on the mattress when the mattress is intentionally inclined for medical reasons. Trying to simultaneously satisfy these directly competing criteria has been a long-standing problem for persons designing mattresses for use on hospital stretchers.

It is therefore an object of the present invention to provide a mattress which facilitates transverse sliding of a patient onto and off of the mattress but which resists sliding of the patient lengthwise of the mattress.

It is a further object of the invention to provide such a mattress which can easily be thoroughly cleaned.

Yet another object of the invention is to provide such a mattress which is relatively inexpensive, but which is durable and will experience no significant degradation in operational performance over a relatively long lifetime of use.

SUMMARY OF THE INVENTION

The objects and purposes of the invention, including those set forth above, are met by providing a mattress having an upwardly facing support surface which can support a person and having structure for resisting sliding movement of the person in a first direction while simultaneously facilitating sliding movement of the person in a second direction which is perpendicular to the first direction.

According to one approach, the top surface of the mattress has a plurality of small, parallel ribs extending substantially parallel to the second direction.

BRIEF DESCRIPTION OF THE DRAWINGS

A preferred embodiment of the present invention will be described in detail hereinafter with reference to the accompanying drawings, in which.

DETAILED DESCRIPTION

Figure 1:
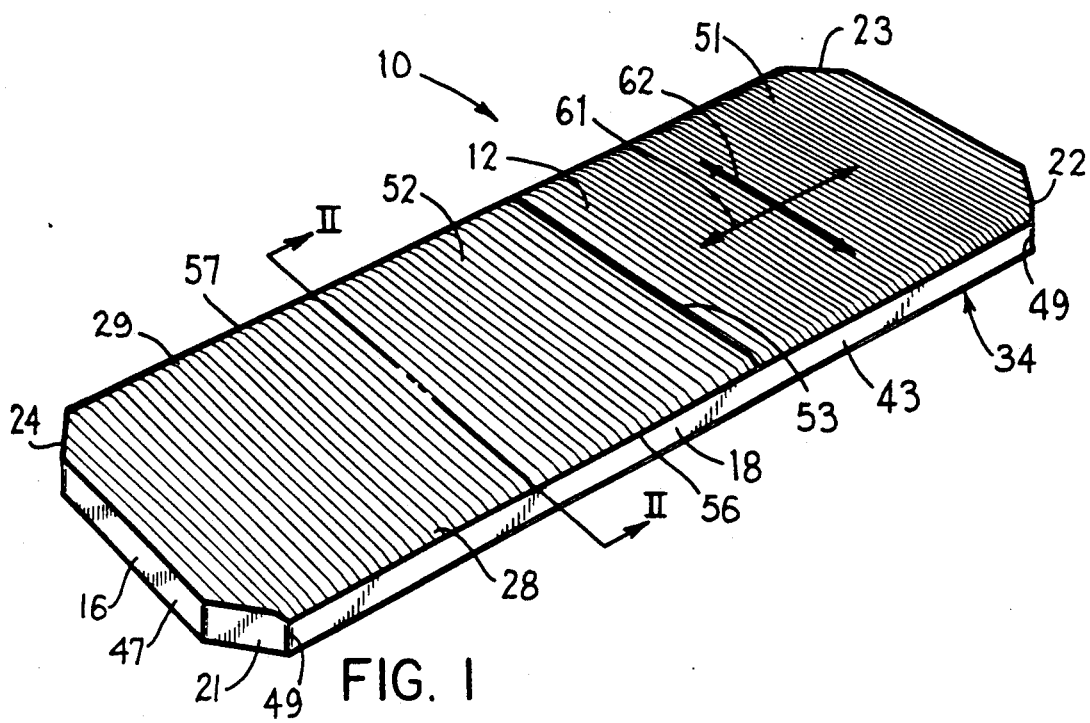
FIG. 1 is a perspective view of a mattress which embodies the present invention and which is intended for use on a hospital stretcher.

Referring to FIG. 1, reference numeral 10 designates a mattress which embodies the present invention. The mattress 10 is approximately rectangular, and has a top surface 12, a bottom surface 13 (FIG. 2), two end surfaces 16, and two side surfaces 18 and 19. Angled surfaces 21, 22, 23 and 24 extend between the end surfaces 16 and the side surfaces 18 and 19 at the corners of the mattress. The mattress has two bevels 28 and 29 (FIG. 2) which extend lengthwise thereof at opposite side edges of the top surface 12.

Figure 2:
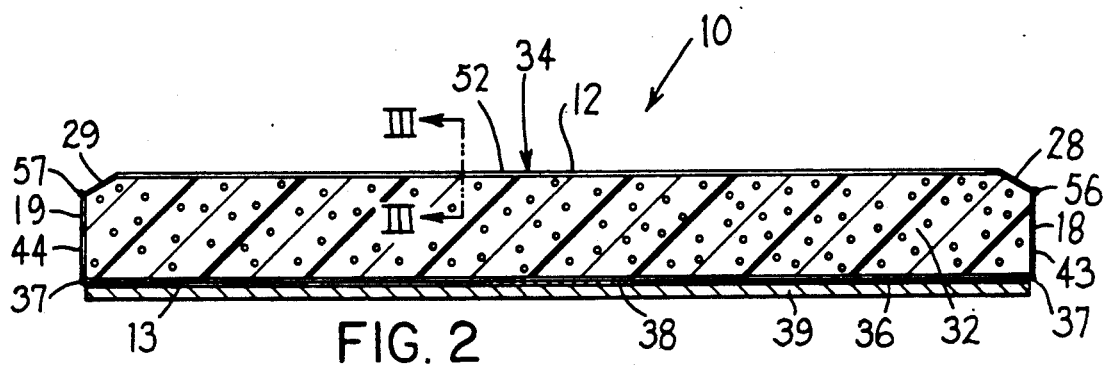
FIG. 2 is a sectional view of the mattress taken along the line II—II in FIG. 1, and of a metal plate of a hospital stretcher which is disposed beneath and supports the mattress.

As shown in FIG. 2, the mattress includes a foam rubber core 32, which has the same overall shape as the mattress 10 and which is preferably made from a single integral piece of foam rubber. The core 32 is enclosed by a cover 34, which is made of a sheet-like material.

The cover 34 includes a bottom piece 36, which has secured to it a piece of Velcro 38 (or a piece of an equivalent hook and loop fastening arrangement). The piece of Velcro 38 is cooperable with a similar piece of Velcro on a metal plate 39 which supports the mattress, in order to prevent horizontal sliding movement of the mattress relative to the metal plate 39. The metal plate 39 is preferably part of a mobile hospital bed, commonly called a stretcher.

The cover 34 further includes two side pieces 43 and 44 extending along the sides 18 and 19 of the mattress, and end pieces 47 extending across the ends 16 and the angled surfaces 21–24 of the mattress, each end piece 47 being secured at opposite ends to the side pieces 43 and 44 by vertical seams 49. Two top pieces 51 and 52 are secured to each other by a seam 53, and together extend between the top edges of the end pieces 47 and the side pieces 43 and 44. The top pieces 51 and 52 are secured to the side pieces 43 and 44 by respective seams 56 and 57, and it will be noted from FIGS. 1 and 2 that the seams 56 and 57 are each at the lower edge of a respective one of the bevels 28 and 29, that the seam 53 extends between seams 56 and 57 perpendicular thereto, and that there are no seams between seams 56 and 57 which extend perpendicular to seams 56 and 57.

An important feature of the mattress 10 is that, as discussed in more detail later, the top surface 12 is designed to resist sliding movement of a patient in directions lengthwise of the mattress 10 (arrow 61) but facilitates sliding movement of the patient in directions transverse of the mattress 10 (arrow 62). This ensures that, if the plate 39 (FIG. 2) and mattress 10 are intentionally inclined for medical purposes, for example to place a patient's head higher than his feet or his feet higher than his head, the top surface 12 of the mattress 10 will resist sliding movement of the patient lengthwise of the mattress 10 in either direction in order to reduce the risk of serious injury to the patient, particularly the injury which would result if the patient slid off the mattress head first. On the other hand, the top surface 12 is also designed to facilitate lateral transfers parallel to arrow 62, so that a patient can easily be slid from the mattress 10 onto the mattress of an adjoining bed, or from the mattress of an adjoining bed onto the mattress 10. Facilitating lateral transfers reduces the risk of back injuries to hospital personnel attempting to move a patient onto or off of the mattress 10.

Figure 3:
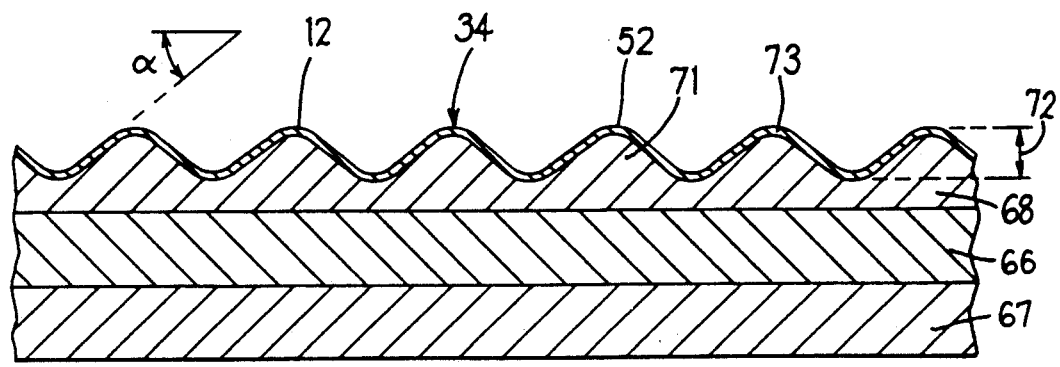
FIG. 3 is a sectional view taken along the line III—III in FIG. 2 of a sheet material used to cover the top of the mattress.

The ability of the top surface 12 of mattress 10 to resist patient movement in certain directions and facilitate patient movement in other directions is due in part to the fact that the top pieces 51 and 52 of the cover are made from a material developed especially for this particular application. More specifically, referring to FIG. 3, the material from which the top pieces 51 and 52 are made is laminated and includes a central layer 66 which is a rip-resistant scrim made from closely woven spun polyester. Layers 67 and 68 made of virgin vinyl films are provided on opposite sides of the scrim 66, the layers 67 and 68 each having anti-fungal and anti-bacterial characteristics and being materials conventionally used in hospital equipment. The layer 68 has a plurality of spaced, parallel ribs 71 which extend across it parallel to the arrows 62 in FIG. 1. In the preferred embodiment, the fabric has twenty ribs 71 per inch, but the number of ribs per inch can be varied, for example within a preferred range of fifteen to twenty-five ribs per inch. As shown in FIG. 3, the sides of each rib form an angle α of about 15° with respect to a horizontal reference, but this angle can be varied, for example within a preferred range of 10° to 30°. The height 72 of the ribs is about 0.005 inches, but the height 72 can be varied, for example within a preferred range of 0.001 to 0.01 inches. An important feature is to keep the valleys between the ribs 71 relatively shallow, so that the top surface of the mattress can be quickly, easily and thoroughly cleaned by hospital personnel.

In the preferred embodiment, the side pieces 43 and 44, the end pieces 47 and the bottom piece 36 are not made from the same material as the top pieces 51 and 52, and in particular are preferably made of an appropriate conventional vinyl material similar to that used for the layers 67 and 68 in FIG. 3. However, it would be possible to make the entire cover 34 from the material shown in FIG. 3.

The entire mattress cover 34 is covered with a conductive carbon overprint, which is shown at 73 in FIG. 3 and which is conventionally used on hospital mattresses. The plate 39 in FIG. 2 is, in a conventional stretcher, electrically coupled to the floor on which the stretcher stands, for example by a metallic chain which drags on the floor or through rubber wheels which include conductive carbon. Thus, since the carbon coating 73 on the mattress 10 is in contact with the plate 39, the surface of the mattress 10 is directly grounded to the floor. This avoids static sparks, which in the past presented a serious hazard in situations where an oxygen tent or flammable anesthetic were being used. Today, the use of oxygen tents and flammable anesthetics is much rarer, but advances in technology have made the conductive feature important for other reasons. For example, the state of the art electrical equipment used in hospitals is increasingly based on microprocessor-type circuitry, which is highly susceptible to erroneous operation if subjected to a significant static discharge.

The material shown in FIG. 3 is made by placing vinyl sheets for the layers 67 and 68 on opposite sides of the sheet for the scrim layer 66, heating all three layers, and then passing them between two rollers which compress them to bond them to each other. One of the rollers has ribs which extend axially or circumferentially in order to form the ribs 71 in layer 68. Thereafter, the conductive carbon overprint 73 is applied to layer 73 as a liquid and is then dried.

Due to the fact that the ribs 71 extend transversely of the mattress 10, they tend to frictionally resist sliding patient movement lengthwise of mattress 10 in directions parallel to the arrows 61 (and perpendicular to ribs 71), while offering less frictional resistance to transverse sliding patient movement parallel to the arrows 62 (and parallel to ribs 71). It will be recognized that the top of the mattress 10 could be made from a single piece of material, but where it is made from at least two pieces as shown at 51 and 52 in FIG. 1, the seam(s) 53 should extend transversely of the mattress parallel to the ribs 71 and arrows 62.

Another important feature is that, as shown in FIG. 62, the mattress has bevels 28 and 29 along its side edges, the seams 56 and 57 connecting the top pieces 51 and 52 to the side pieces 43 and 44 are located at the lower edges of the bevels 28 and 29, and the pieces 51 and 52 each extend from the seam 56 to the seam 57 without any intervening seams. This ensures that there are no lengthwise seams on the very top of the mattress which could tend to resist transverse sliding movement of a patient, the seams 56 and 57 each being located downwardly from the top surface 12 of the mattress 10 so that they will not be able to engage a patient, his bed clothes or a sheet being transferred with him onto or off of the mattress 10 parallel to the arrow 62, and thus cannot offer resistance to the transfer.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus comprising: a mattress having an upwardly facing support surface which can support a person and having means for resisting sliding movement of the person in a first direction and for simultaneously facilitating sliding movement of the person in a second direction which is perpendicular to said first direction; wherein said means includes said top surface of said mattress having a plurality of small, parallel ribs extending substantially parallel to said second direction; and wherein the number of said ribs is in the range of 10 to 25 per inch.

2. An apparatus as recited in claim 1, wherein there are substantially 20 ribs per inch.

3. An apparatus as recited in claim 1, wherein said mattress includes a sheet material which is a single monolithic part made of a single material and which has thereon said upwardly facing support surface, and wherein said means is integral to said sheet material.

4. An apparatus as recited in claim 3, wherein said mattress has bevels extending along opposite side edges of said support surface substantially perpendicular to said second direction, said sheet material extending from a lower edge of one said bevel to a lower edge of the other of said bevels without intervening seams extending in said first direction.

5. An apparatus as recited in claim 3, wherein said sheet material includes a vinyl layer and said ribs are formed out of said vinyl layer, said vinyl later having anti-fungal and anti-bacterial characteristics.

6. An apparatus as recited in claim 3, wherein said ribs are integral to said sheet material.

7. An apparatus comprising: a mattress having an upwardly facing support surface which can support a person and having means for resisting sliding movement of the person in a first direction and for simultaneously facilitating sliding movement of the person in a second direction which is perpendicular to said first direction; wherein said means includes said top surface of said mattress having a plurality of small, parallel ribs extending substantially parallel to said second direction; and wherein each said rib has a height in the range of 0.01 to 0.001 inches.

8. An apparatus as recited in claim 7, wherein each said rib has a height of substantially 0.005 inches.

9. An apparatus comprising: a mattress having an upwardly facing support surface which can support a person and having means for resisting sliding movement of the person in a first direction and for simultaneously facilitating sliding movement of the person in a second direction which is perpendicular to said first direction, wherein said support surface of said mattress is defined by a sheet material which covers the top of said mattress and which includes a synthetic layer and a plurality of ribs formed out of said synthetic layer and extending parallel to said second direction, said synthetic layer having anti-fungal and anti-bacterial characteristics; wherein said synthetic layer is made of vinyl, wherein said material includes a rip-resistant scrim made of a closely woven spun polyester material, said scrim having on one side thereof said first-mentioned vinyl layer and having on the other side thereof a further vinyl layer, said ribs being provided on a side of said first-mentioned vinyl layer remote from said scrim.

10. An apparatus as recited in claim 9, wherein said first-mentioned layer has on a side thereof opposite from said scrim a conductive carbon overprint.

* * * * *